2 Sheets—Sheet 1.
E. R. CAHOONE & N. TEAS.
HARNESS-SADDLE.
No. 191,829. Patented June 12, 1877.
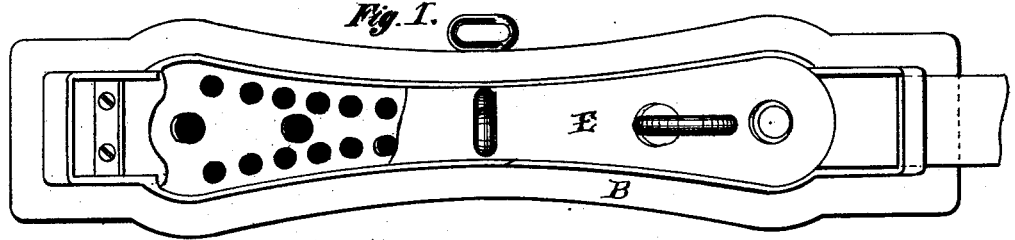
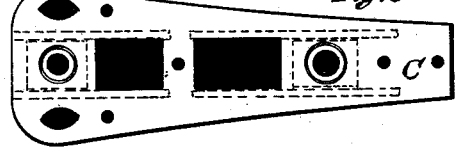
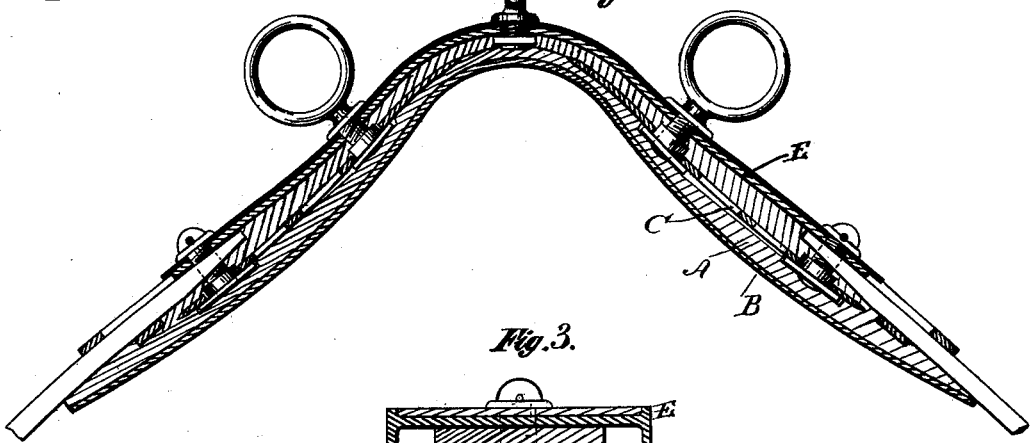
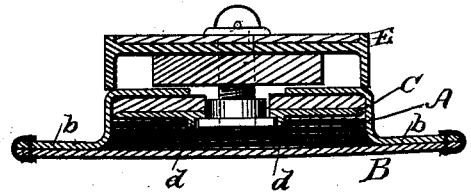
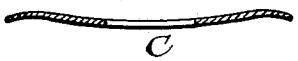
Witnesses.
C. Clarence Poole
Aug. Jordan
Inventors.
E. R. Cahoone
N. Teas
By their Atty J. C. Clayton E. R. CAHOONE & N. TEAS.
HARNESS-SADDLE.
No. 191,829. Patented June 12, 1877.
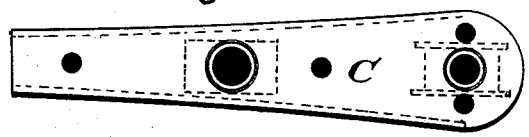
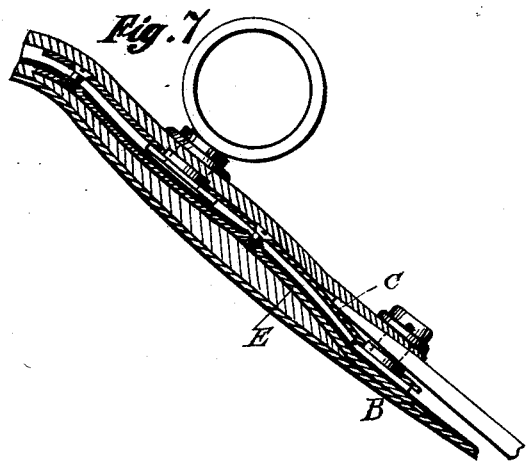
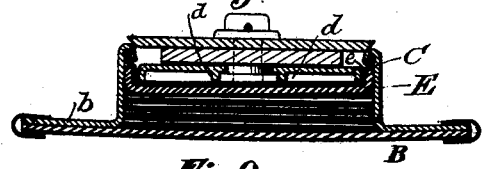
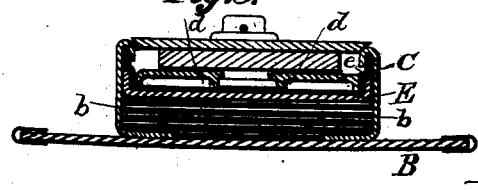

UNITED STATES PATENT OFFICE.

EDWIN R. CAHOONE AND NOBLE TEAS, OF NEWARK, NEW JERSEY.

IMPROVEMENT IN HARNESS-SADDLES.

Specification forming part of Letters Patent No. 191,829, dated June 12, 1877; application filed May 11, 1877.

*To all whom it may concern:*

Be it known that we, EDWIN R. CAHOONE and NOBLE TEAS, of Newark, in the county of Essex, in the State of New Jersey, have invented new and useful Improvements in Harness-Saddles, of which the following is a full and exact description, having reference to the accompanying drawing, wherein—

Figure 1 is a plan of our saddle. Fig. 2 is a longitudinal section. Fig. 3 is a transverse section of the same. Fig. 4 is a transverse section of the inner plate. Fig. 5 is a plan of the same. Figs. 6, 7, 8, 9 represent modifications in structure.

Our invention relates to a combined pad and housing; and consists, first, in a pad and housing constructed with the housing at the bottom and pad on top; second, in an internal plate to receive and hold the mounting nuts; third, in a tree with upturned edges.

The pad and housing are united by the same stitches, and the housing being at the bottom next the horse's back, gives it all the advantages of a regular hand-made pad and separate housing, while the cost is very much less than if made in the usual way, when straps and buckles must be used to secure the housing to the pad.

The pad A is formed on the upper side of the housing B by sewing or attaching two pieces or strips, $b$, of leather, to the edges of the housing-piece, and bringing the free edges of said strips over the pad A, where they are tacked fast, or otherwise secured to the top of the pad, thereby utilizing the leather usually employed for lining the housing to form the side covering of the pad. This saves labor and stock. E is the ordinary continuous plate or tree, which extends over the horse's back from side to side, and supports the terrets and other trimmings. The plate C is provided with holes to admit the entrance of the nuts and ribs $d\ d$ to guide them to their places, gives more strength and stiffness to the pad than it would otherwise have, and keeps it in shape during the process of manufacture, which, of itself, is a very essential point in making this pad. There are also holes for tufting or quilting through, or for the attachment of a lining-piece to be below the nuts when they are in their places, and to prevent the stuffing from passing through the slots.

In Figs. 6, 7, 8, and 9 the plate C is shown in a different position as relates to the tree E, which, in this modification, the tree is placed inside of the pad, and the plate C outside of the same; otherwise the arrangement and operation is the same.

The structure of the tree E, however, is peculiar, the edges being turned up so as to support the pad-leather $b$, as shown in Figs. 8 and 9. The top leather $e$ is then sewed to the edges of the leather $b$ and stretched over the tree E. It is held down by the plate C, which is secured by screws to the tree E, as shown in Fig. 7.

Having described our improvement, what we claim as new is—

1. A combined housing and pad, when the same is constructed with the housing under the pad, as shown and described.

2. In combination with a combined pad and housing, with the housing under the pad, an under plate adapted to permit the terret and screw-nuts to be removed or replaced, all substantially as shown and described.

3. In combination with a pad and housing, in which the housing is below the pad, a tree-frame inside said pad, all substantially as shown and described.

4. The tree E, constructed with edges turned upward, as shown in Figs. 8 and 9, combined with the pad-leather $b\ e$ and plate C, as set forth.

In testimony whereof we have hereunto subscribed our names this 3d day of April A. D. 1877.

EDWARD R. CAHOONE.
NOBLE TEAS.

Witnesses:
ROBT. CRAIG,
JOHN J. BALDWIN.